(12) United States Patent
Hotta

(10) Patent No.: US 10,718,275 B2
(45) Date of Patent: Jul. 21, 2020

(54) MILLER CYCLE ENGINE

(71) Applicant: TOYOTA JIDOSHA KABUSHIKI KAISHA, Toyota-shi, Aichi-ken (JP)

(72) Inventor: Shintaro Hotta, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/506,159

(22) Filed: Jul. 9, 2019

(65) Prior Publication Data

US 2020/0072134 A1 Mar. 5, 2020

(30) Foreign Application Priority Data

Sep. 4, 2018 (JP) .................. 2018-165258

(51) Int. Cl.
| | |
|---|---|
| *F02D 13/02* | (2006.01) |
| *F01L 1/34* | (2006.01) |
| *B60W 30/192* | (2012.01) |
| *B60W 10/06* | (2006.01) |
| *F02D 29/02* | (2006.01) |
| *F02N 19/00* | (2010.01) |
| *B60K 6/48* | (2007.10) |

(52) U.S. Cl.
CPC ............ *F02D 13/0226* (2013.01); *B60K 6/48* (2013.01); *B60W 10/06* (2013.01); *B60W 30/192* (2013.01); *F01L 1/34* (2013.01); *F02D 13/0238* (2013.01); *F02D 29/02* (2013.01); *F02N 19/004* (2013.01); *F02N 19/005* (2013.01); *F02D 2013/0292* (2013.01); *F02N 2019/008* (2013.01); *F02N 2200/022* (2013.01)

(58) Field of Classification Search
CPC ............ F02D 13/0269; F02D 13/0226; F02D 13/0238; F02D 28/00; F02D 29/02; F01L 1/34; B60W 30/192; F02N 19/004; F02N 19/005; B60K 6/48
See application file for complete search history.

(56) References Cited

U.S. PATENT DOCUMENTS

| | | | | |
|---|---|---|---|---|
| 2010/0139591 | A1* | 6/2010 | Nakamura | F01L 13/0026 123/90.16 |
| 2011/0197834 | A1* | 8/2011 | Gustafson | F02D 13/0226 123/90.15 |

(Continued)

FOREIGN PATENT DOCUMENTS

JP 2011-190768 A 9/2011

*Primary Examiner* — George C Jin
(74) *Attorney, Agent, or Firm* — Oliff PLC

(57) ABSTRACT

A miller cycle engine according to the present disclosure includes: a variable valve operating device configured to continuously change the closing timing of an intake valve; a throttle valve arranged in an intake air passage; and a control device configured to execute an early closing miller cycle operation mode to control the variable valve operating device such that the intake valve closes at an intake bottom dead center or earlier. The control device is configured to: execute a late closing mode (e.g., decompression mode) to retard the closing timing relative to the intake bottom dead center at the time of engine start-up; and execute, where the pressure in the intake air passage has decreased to a first threshold value or lower first after the engine start-up, a mode switching processing to switch from the late closing mode to the early closing miller cycle operation mode.

7 Claims, 6 Drawing Sheets

(56) References Cited

U.S. PATENT DOCUMENTS

| | | | |
|---|---|---|---|
| 2011/0231077 A1 | 9/2011 | Nakamura | |
| 2014/0364273 A1* | 12/2014 | Martin | B60W 10/06 477/3 |
| 2015/0040863 A1* | 2/2015 | Kaneko | F02P 5/1523 123/406.12 |
| 2017/0037787 A1* | 2/2017 | Watanabe | F01L 1/3442 |

* cited by examiner

MILLER CYCLE ENGINE

CROSS-REFERENCE TO RELATED APPLICATION

This application is based on and claims the benefit of Japanese Patent Application No. 2018-165258, filed on Sep. 4, 2018, which is incorporated by reference herein in its entirety.

BACKGROUND

Technical Field

The present disclosure relates to a miller cycle engine, and more particularly to a miller cycle engine configured to perform an early closing miller cycle operation mode by the use of a variable valve operating device configured to continuously change the closing timing of an intake valve.

Background Art

For example, JP 2011-190768 A discloses a variable valve control device for a hybrid vehicle.

According to the aforementioned variable valve control device, during the running of the hybrid vehicle, the closing timing of an intake valve is advanced as compared to the intake bottom dead center, which corresponds to an example of an early closing miller cycle operation mode. On the other hand, at the time of engine start-up, the closing timing of the intake valve is retarded as compared to the intake bottom dead center, which corresponds to an example of a late closing mode. In order to enable the closing timing to be controlled in this way, the variable valve control device uses a variable valve operating device having the function of continuously changing the operating angle and lift amount of the intake valve and the function of continuously changing the center phase of the operating angle.

SUMMARY

According to a miller cycle engine provided with a variable valve operating device that "continuously" changes the closing timing of an intake valve as disclosed in JP 2011-190768 A, the closing timing passes though the intake bottom dead center in the course of switching to the early closing miller cycle operation mode after the late closing mode is performed at the time of engine start-up. When the closing timing passes through the intake bottom dead center, the actual compression ratio becomes higher. As a result, knocking becomes easy to occur.

The present disclosure has been made to address the problem described above, and an object of the present disclosure is to provide a miller cycle engine that includes a variable valve operating device that continuously changing the closing timing of an intake valve and that can prevent the knocking from becoming easy to occur in the course of switching to an early closing miller cycle operation mode from a late closing mode after an engine start-up.

A miller cycle engine according to the present disclosure includes: a variable valve operating device configured to continuously change a closing timing of an intake valve; a throttle valve arranged in an intake air passage; and a control device configured to execute an early closing miller cycle operation mode to control the variable valve operating device such that the intake valve closes at an intake bottom dead center or earlier. The control device is configured to: execute a late closing mode to retard the closing timing relative to the intake bottom dead center at a time of engine start-up; and execute, where a pressure in the intake air passage has decreased to a first threshold value or lower first after the engine start-up, a mode switching processing to switch from the late closing mode to the early closing miller cycle operation mode.

The control device may be configured to permit an opening of the throttle valve after the closing timing passes through the intake bottom dead center as a result of execution of the mode switching processing.

The miller cycle engine may further include a supercharging pressure control actuator configured to control supercharging pressure. Also, the control device may be configured to permit a start of operation of the supercharging pressure control actuator after the closing timing passes through the intake bottom dead center as a result of execution of the mode switching processing.

The control device may also be configured, after execution of a fuel cut operation to stop the internal combustion engine, to switch from the early closing miller cycle operation mode to the late closing mode.

The control device may also be configured, where the pressure in the intake air passage has decreased to a second threshold value or lower after an engine stop request is issued, to switch from the early closing miller cycle operation mode to the late closing mode.

The variable valve operating device may also be an electrically driven variable valve timing device including an electric motor that changes a rotational phase of a camshaft with respect to a rotational phase of a crankshaft. The control device may further be configured, during an engine stop, to switch from the early closing miller cycle operation mode to the late closing mode.

The variable valve operating device may also be configured to change the closing timing by changing an opening timing of the intake valve along with the closing timing while an operating angle of the intake valve is fixed.

According to the miller cycle engine of the present disclosure, after waiting for the pressure in the intake air passage to decrease to the first threshold value or lower first after the engine start-up, the control device performs the mode switching processing to switch from the late closing mode to the early closing miller cycle operation mode. As a result, the closing timing of the intake valve passes through (i.e., crosses) the intake bottom dead center after the pressure in the intake air passage decreases after the engine start-up. Thus, the in-cylinder charge air amount (i.e., in-cylinder pressure) can be reduced in the vicinity of the intake bottom dead center at which the actual compression ratio becomes high. Because of this, the knocking can be prevented from becoming easy to occur in the course of the switching to the early closing miller cycle operation mode from the late closing mode after the engine start-up.

DETAILED DESCRIPTION

In the following, embodiments of the present disclosure, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. First Embodiment

A first embodiment according to the present disclosure will be described with reference to FIGS. 1 to 7.

1-1. Configuration of System

Figure 1:
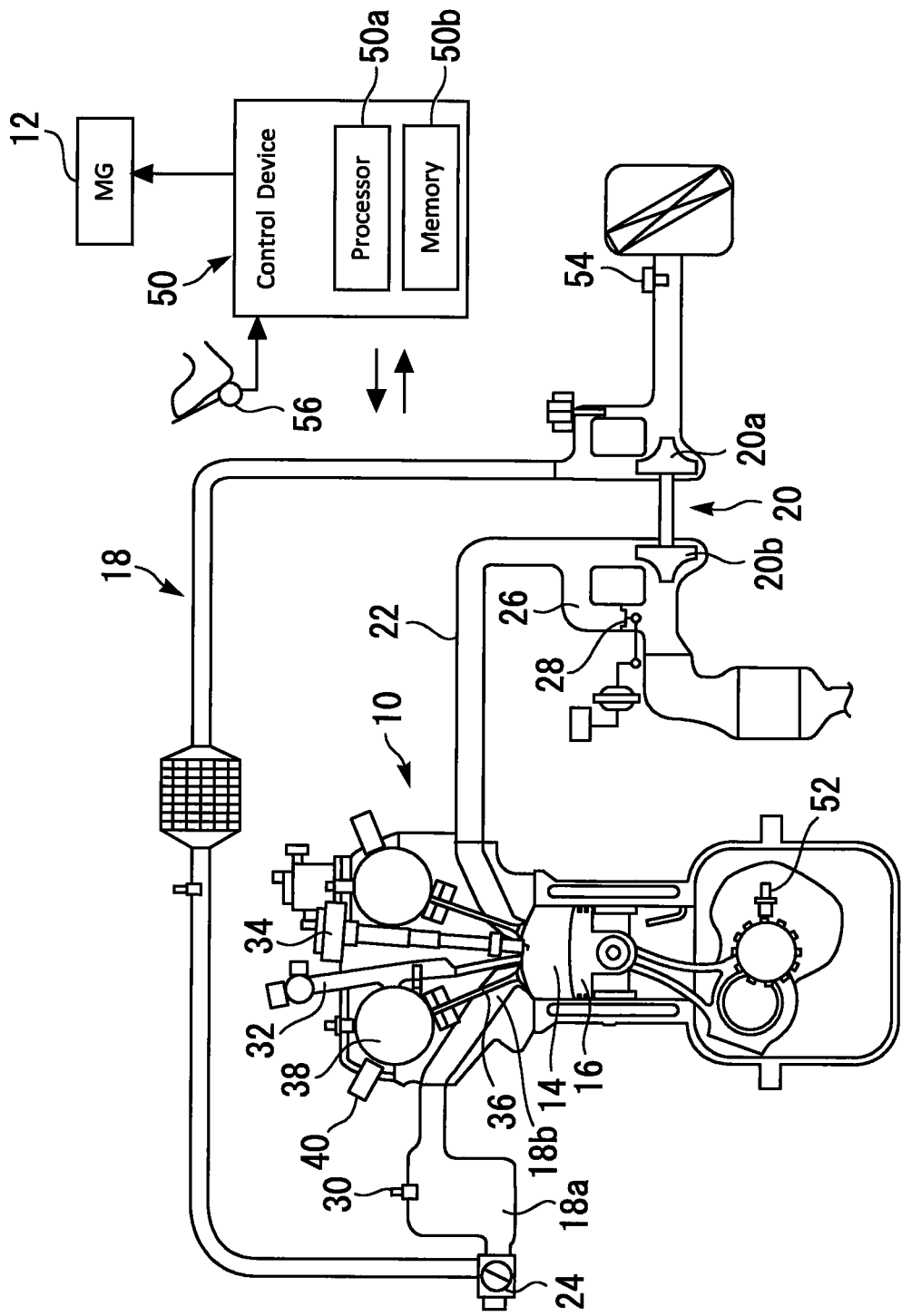
FIG. 1 is a schematic diagram for describing a configuration of a system according to a first embodiment of the present disclosure.

FIG. 1 is a schematic diagram for describing a configuration of a system according to the first embodiment. The system shown in FIG. 1 is provided with a spark-ignition internal combustion engine (for example, gasoline engine) 10 as an example. The vehicle on which the internal combustion engine 10 is mounted is, as an example, a hybrid vehicle provided with a motor generator (MG) 12 in addition to the internal combustion engine 10 as its power sources.

In each cylinder 14 of the internal combustion engine 10, a piston 16 is arranged. The pistons 16 reciprocate in the respective cylinders 14. The internal combustion engine 10 is a supercharged engine as an example, and in an intake air passage 18 of the internal combustion engine 10, a compressor 20a of a turbo-supercharger 20 is arranged. The compressor 20a is rotatably driven by a turbine 20b arranged in an exhaust gas passage 22. An electronically-driven throttle valve 24 is arranged downstream of the compressor 20a. An exhaust gas bypass passage 26 that bypasses the turbine 20b is connected to the exhaust gas passage 22. A waste gate valve (WGV) 28 for controlling supercharging pressure is arranged in the exhaust gas bypass passage 26. It should be noted that the WGV 28 corresponds to an example of the "supercharging pressure control actuator" according to the present disclosure.

An intake air pressure sensor 30 is arranged in a collective portion (i.e., surge tank) of an intake manifold 18a located downstream of the throttle valve 24. The intake air pressure sensor 30 outputs a signal responsive to the pressure in a portion of the intake air passage 18 located in the downstream side of the throttle valve 24 (hereunder, simply abbreviated as "intake air pressure"). In addition, the internal combustion engine 10 is equipped with fuel injection valves 32 arranged for the respective cylinders 14 and an ignition device 34. The fuel injection valves 32 inject fuel directly into the respective cylinders 14 as an example.

Intake valves 36 that open and close intake ports 18b, respectively, are driven by a variable valve operating device 38. An example of the variable valve operating device 38 is an electrically driven variable valve timing device (hereunder, simply referred to as an "electric VVT") configured to change the rotational phase of a camshaft with respect to the rotational phase of a crankshaft by the use of an electric motor (not shown). According to the electric VVT 38, the opening and closing timings (i.e., the phase of valve opening duration) of the intake valves 36 can be continuously changed, within a designated control range, while the operating angle of the intake valves 36 (i.e., the valve opening duration thereof (more specifically, the crank angle width in which the intake valves 36 are open)) is fixed. According to the present embodiment, the closing timing IVC of the intake valves 36 is continuously made variable by the use of this kind of the electric VVT 38. A cam angle sensor 40 that outputs a signal responsive to the rotational phase of the camshaft (i.e., cam angle) is arranged in the vicinity of the camshaft described above.

Furthermore, the system according to the present embodiment is provided with a control device 50 for controlling the internal combustion engine 10 and the MG 12. The control device 50 is an electronic control unit (ECU) that includes a processor 50a and a memory 50b. The memory 50b stores various programs for controlling the internal combustion engine 10 and the MG 12. The processor 50a reads out a program from the memory 50b and executes the program. It should be noted that the control device 50 may alternatively be configured with a plurality of ECUs.

The control device 50 receives sensor signals from various sensors. The various sensors include, for example, a crank angle sensor 52, an air flow sensor 54 and an accelerator position sensor 56 as well as the intake air pressure sensor 30 and the cam angle sensor 40 that are described above. The crank angle sensor 52 and the air flow sensor 54 output signals responsive to the crank angle and the intake air flow rate in the intake air passage 18, respectively. The control device 50 can calculate the engine speed NE by the use of signals from the crank angle sensor 52. The accelerator position sensor 56 outputs a signal responsive to the depression amount of an accelerator pedal of the vehicle (i.e., accelerator position). In addition, the processor 50a executes various programs by the use of received sensor signals, and also outputs actuating signals for controlling the actuators described above, that is, the throttle valve 24, the WGV 28, the fuel injection valves 32, the ignition device 34 and the electric VVT 38.

1-2. Engine Control

The engine control performed by the control device 50 includes an air amount control and an intake valve timing control using the electric VVT 38 (i.e., a control of the closing timing IVC of the intake valves 36). This intake valve timing control includes an "early closing miller cycle operation mode" and a "decompression mode". Hereunder, the early closing miller cycle operation mode is conveniently abbreviated as an "early closing mode".

1-2-1. Air Amount Control

The air amount control in the internal combustion engine 10 that is a supercharged engine is performed by the use of the WGV 28 as well as the throttle valve 24. To be more specific, the control device 50 calculates a required engine torque from a driver on the basis of the accelerator position, and also calculates a required air amount that is an in-cylinder charge air amount required to achieve a calculated required engine torque. It should be noted that, as a premise of the calculation of the required air amount, the stoichiometric air-fuel ratio is used as an example of a target air-fuel ratio, and the ignition timing (spark timing) is controlled to an optimum spark timing (for example, a more retarded ignition timing of an MBT (Minimum Advance for Best Torque) ignition timing and a trace knock ignition timing). An actual in-cylinder charge air amount (engine load factor) can be, for example, calculated using a known mathematical model of intake system, on the basis of the engine speed NE and the intake air flow rate detected by the air flow sensor 54.

According to the air amount control, in order to satisfy the required air amount, the control device 50 controls the opening degree of the throttle valve 24 (throttle opening degree) in accordance with an information (for example, a map) that defines a relationship among the required air amount, the engine speed NE and the throttle opening degree. Moreover, in order to satisfy a required supercharging pressure required to achieve the required air amount, the control device 50 controls the opening degree of the WGV 28 (WGV opening degree) in accordance with an information (for example, a map) that defines a relationship among the required supercharging pressure, the engine speed NE, the throttle opening degree and the WGV opening degree. Furthermore, the relationships of these maps are changed in accordance with the closing timing IVC of the intake valves 36.

1-2-2. Early Closing Miller Cycle Operation Mode (Early Closing Mode)

Figure 2:
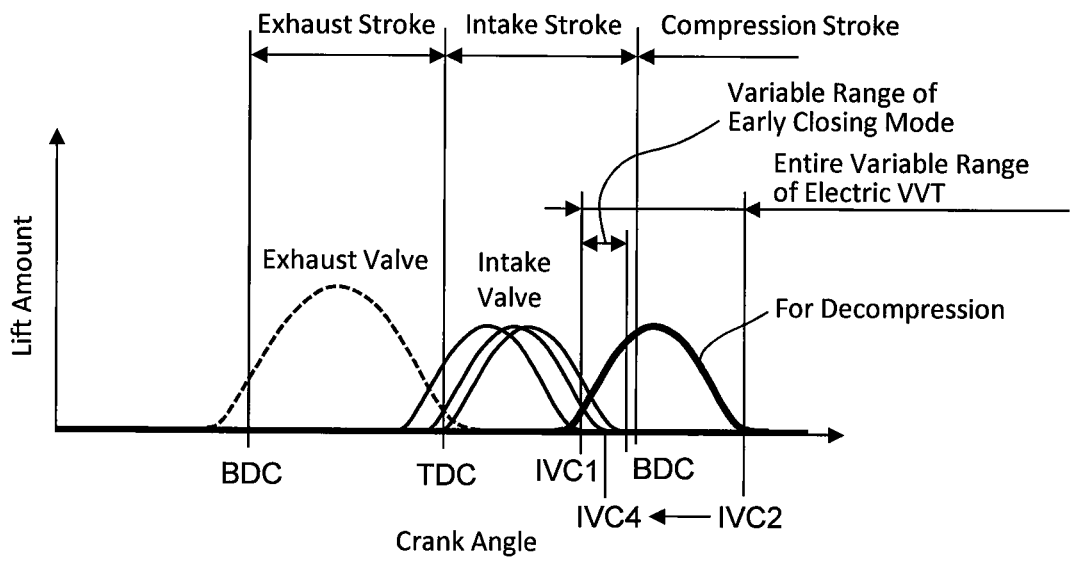
FIG. 2 is a graph that illustrates an example of closing timings IVC selected in an early closing miller cycle operation mode and a decompression mode according to the first embodiment of the present disclosure.

FIG. 2 is a graph that illustrates an example of the closing timings IVC selected in the early closing miller cycle operation mode and the decompression mode according to the first embodiment. The early closing mode is performed by controlling the electric VVT 38 such that the intake valves 36 close before the intake bottom dead center (hereunder, also simply referred to as "BDC"), that is, early close. That is to say, the internal combustion engine 10 is a "miller cycle engine" using the early closing of the intake valves 36.

To be more specific, according to the early closing mode, the amount of early closing (early closing amount) that is an amount of advance (=IVC-BDC>0) of the closing timing IVC of the intake valves 36 with respect to the BDC is changed in accordance with engine operating conditions. In FIG. 2, an example of variable range of the closing timing IVC used in the early closing mode is shown. Basically, the amount of early closing of the closing timing IVC is controlled so as to become greater when a required engine output power is lower. On the other hand, when the required engine output power is higher, the amount of early closing is controlled so as to become smaller in order to increase the intake efficiency (i.e., charging efficiency) of the intake air (that is, such that the closing timing IVC approaches the BDC to a greater extent).

(Specific Examples of Operating Angle and Lift Amount of Intake Valve)

A valve lift curve that is available when a device of the constant (i.e., fixed) operating angle type is used to execute the early closing mode is unique. Because of this, it is required to select an operating angle that can achieve a desired amount of early closing while preventing the opening timing IVO from being excessively advanced. As can be understood from the operating angles of an intake valve according to a comparative example 1 of late closing and a comparative example 3 of early closing in FIG. 2, in order to satisfy this request, the operating angle according to the example of early closing inevitably becomes smaller than that according to the example of late closing. On the other hand, if the device of the constant operating angle type is used, it is also required to properly cover, with one valve lift curve, a broad engine operating region from a low output power region to a high output power region (i.e., to a region in which the degree of demand for obtaining a great amount of air is high). If the latter request is also taken into consideration, reducing the operating angle is also limited.

Broadly speaking, values that can be used as the operating angle of the intake valve 36 according to the present embodiment that is controlled by the electric VVT 38 of the "constant operating angle type" are not particularly limited. On that basis, when two requests described above are taken into consideration, numeral values that the inventor of the present disclosure considers as a favorable operating angle of the intake valve 36 are 170 to 200 degrees in crank angle. According to the example shown in FIG. 2, 180 degrees included in this numeral value range is used as the operating angle of the intake valve 36.

In further addition to the above, the shape of the valve lift curve of an intake valve is mainly specified by the lift amount and as the operating angle. In more detail, the lift amount mentioned here indicates a maximum lift amount of the valve lift curve. Broadly speaking, values that can be used as the lift amount of the intake valve 36 are also not especially limited. On that basis, where the operating angle is selected within a range of 170 to 200 degrees as described above, the lift amount cannot be selected freely. That is to say, the lift amounts being selectable are limited in accordance with the respective selected operating angles due to reasons (such as, avoidance of the occurrence of abnormal behavior (valve jump or valve bounce) of the intake valve 36). Also, where the operating angle is selected within the range of 170 to 200 degrees and the latter request described above is taken into consideration also regarding the selection of the lift amount, numeral values that the inventor of the present disclosure considers as a favorable lift amount are 6 to 10 mm. According to the example shown in FIG. 2, 8 mm that is included in this numeral range is used as the lift amount (more specifically, the maximum lift amount) of the intake valve 36.

1-2-3. Decompression Mode

At the time of engine start-up (more specifically, during cranking), reduction of the vibration of a floor of a vehicle due to the resonance of a power train (an internal combustion engine and a power transfer device connected thereto) can be achieved by performing a decompression for releasing compression pressure in a cylinder.

According to present embodiment, the decompression is achieved by performing the decompression mode using the control of the closing timing IVC. In more detail, according to the decompression mode that performs the decompression at the time of engine start-up, as shown in FIG. 2, the electric VVT 38 is controlled so as to late close the intake valves 36 as compared to the BDC. Although the details are described below with reference to FIG. 5, the closing timing IVC is controlled to the early closing side (in the example shown in FIG. 2, a closing timing IVC4) after the end of the decompression mode. It should be noted that the decompression mode corresponds to an example of the "late closing mode" according to the present disclosure.

Figure 3:
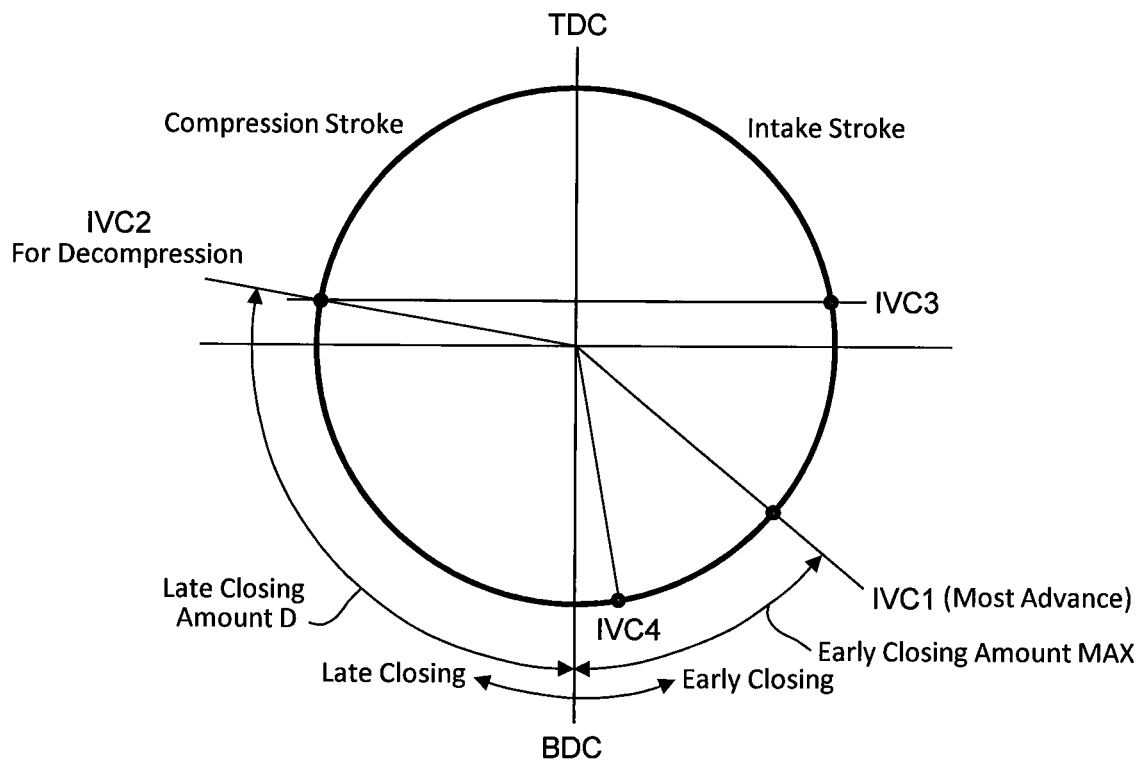
FIG. 3 is a diagram for describing an example of the setting of a closing timing IVC2 that is selected during the execution of the decompression mode according to the first embodiment of the present disclosure.

FIG. 3 is a diagram for describing an example of the setting of a closing timing IVC2 that is selected during the execution of the decompression mode according to the first embodiment. FIGS. 2 and 3 show a closing timing IVC1 selected at the time of the amount of early closing being the greatest (i.e., being most advanced) and the closing timing IVC2 selected in decompression mode. The electric VVT 38 can continuously change the closing timing IVC within a range from the closing timing IVC1 to the closing timing IVC2.

The closing timing IVC2 used in the decompression mode in the present embodiment is specified as follows when compared to the closing timing IVC1 being most advanced. That is to say, a late closing amount D (=IVC2−BDC>0) in the decompression mode is greater than an early closing amount MAX (=IVC−BDC>0) obtained when the closing timing IVC is most advanced. According to the example shown in FIG. 3, the closing timing IVC1 is −50 degrees after bottom dead center (−50 degrees ABDC) and the closing timing IVC2 is 100 degrees ABDC.

Broadly speaking, the late closing amount used in the decompression mode is not limited to the late closing amount D that is specified as shown in FIG. 3. On that basis, according to the present embodiment using the electric VVT 38 of the "constant operating angle type", the following advantageous effects can be achieved by the use of the late closing amount D.

That is to say, a closing timing IVC3 in FIG. 3 corresponds to a closing timing that is required to achieve the decompression using the early closing while decreasing the compression pressure at the same level as the closing timing IVC2 located on the late closing side. If, in a miller cycle engine that performs the early closing by the use of a device of the "constant operating angle type" as in the electric VVT 38, the control of the closing timing IVC is performed using only the early closing side including the decompression mode, an engine configuration that makes it possible to advance the closing timing IVC to the closing timing IVC3 is required. However, if the closing timing IVC is advanced for the decompression by the use of the device of the "constant operating angle type", the opening timing IVO is also advanced in association therewith. As a result, the valve lift amount at and near the exhaust top dead center (TDC) becomes greater. This means that a valve recess of a piston required to avoid a valve stamp (i.e., collision between the valve and the piston) enlarges (i.e., becomes deeper). If the valve recess is deepened while an equal compression ratio is maintained, it is required to elevate the position of a portion other than the valve recess on a piston top surface (mainly, a central portion of the piston top surface). As a result, when compared at the same crank angle, a distance between a spark plug arranged at the center of the top portion of a combustion chamber and the piston top surface becomes shorter. This leads to a decrease of a tumble ratio during the compression stroke, and, as a result, turbulence of in-cylinder gas that is generated at and near the compression top dead center becomes weaker. Also, a decrease of the turbulence of the in-cylinder gas leads to a decrease of burning speed (i.e., deterioration of combustion). In contrast to this, according to the present embodiment that performs the decompression mode with the late closing amount D that is specified as described above, the decompression can be achieved while decreasing the compression pressure at the same level as the closing timing IVC3 without the need of advancing, as compared to the closing timing IVC1, a limit value of the closing timing on the advance side.

Furthermore, the closing timing IVC4 in FIGS. 2 and 3 is an example of the closing timing IVC used when the early closing mode is started after the end of the decompression mode. In more detail, this closing timing IVC4 is set near the BDC in order to improve the startability by improving the actual compression ratio (i.e., effective compression ratio). After the end of the decompression mode, the closing timing IVC is changed to the IVC4 from the IVC2 via the BDC.
(Specific Example of Change Amount of Closing Timing IVC)

Furthermore, with reference to FIG. 3, a specific example of the change amount of the closing timing IVC associated with the execution of the decompression mode according to the present embodiment will be described.

According to the electric VVT 38 of the "constant operating angle type" used in the present embodiment, the closing timing IVC can be changed within a desired broad variable range, with a selection of a gear ratio between the electric motor and the camshaft. An example of the variable range (=IVC2−IVC1) in the example shown in FIG. 3 is 150 degrees. According to the present embodiment, in order to achieve the decompression mode, a great late closing amount D (in the example shown in FIG. 3, 100 degrees) located within a range of equal to or greater than 90 degrees and smaller than 180 degrees is obtained by the use of this kind of electric VVT 38.

Accordingly, when the decompression mode is performed, the closing timing IVC is controlled, toward the closing timing IVC2 from a closing timing IVC on the early closing side according to the early closing mode, such that the late closing amount D located within the range of equal to or greater than 90 degrees and smaller than 180 degrees is obtained. In other words, the closing timing IVC is controlled such that the third quadrant that is one of four quadrants on the coordinate plane in FIG. 3 (0 degrees<IVC<90 degrees ABDC) is skipped and the closing timing IVC2 that is located within the fourth quadrant (90 degrees<IVC<180 degrees ABDC) or equal to 90 degrees ABDC is obtained. In addition, where the decompression mode is ended, the closing timing IVC is controlled, toward a closing timing on the early closing side according to the early closing mode (in the example shown in FIG. 3, IVC4) from the closing timing IVC2, so as to skip the third quadrant.

1-2-4. Issues Due to Switching Between Late Closing Mode and Early Closing Mode

First, if the electric VVT 38 that "continuously" changes the closing timing IVC is used, the closing timing IVC passes through (i.e., crosses) the BDC in the course of the switching to the early closing mode from the decompression mode (late closing mode) after an engine start-up (more specifically, immediately after the completion of the engine start-up).

Figure 4:
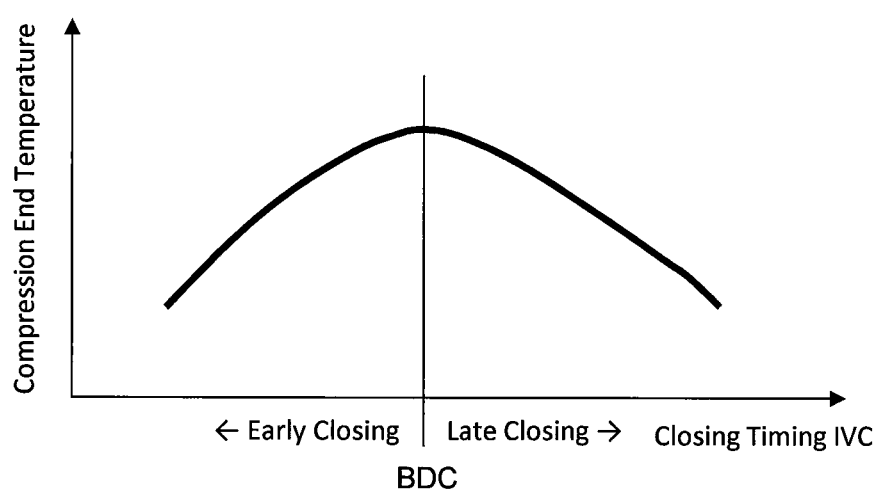
FIG. 4 is a graph that illustrates a relationship between the closing timing IVC and compression end temperature.

FIG. 4 is a graph that illustrates a relationship between the closing timing IVC and compression end temperature. To be more specific, FIG. 4 shows the relationship obtained immediate after the completion of engine start-up, that is, when the engine speed NE is in an idling range (extremely low speed range). Closing timings IVC at which the compression end temperature shows a peak are different depending on engine speed ranges. According to an example immediately after the completion of engine start-up as shown in FIG. 4, the engine speed NE is low, and thus, the compression end temperature becomes the highest at the BDC at which the actual compression ratio becomes the highest. If the compression end temperature becomes higher, knocking becomes easier to occur. Because of this, reducing the knocking that may occur due to this kind of cause is desirable.

Also, in the air amount control described above, if the intake air amount is increased by an operation to open the throttle valve 24 when the closing timing IVC passes through the BDC after an engine start-up, the knocking may become easy to occur. Moreover, according to the example of the internal combustion engine 10 that is a supercharged engine, if the supercharging pressure is increased by an operation to close the WGV 28 when the closing timing IVC passes through the BDC, the knocking becomes easy to occur. Because of this, reducing the knocking that may occur due to these kinds of causes is desirable.

Furthermore, in order to enable the decompression mode to be used at the time of engine start-up, the switching to the decompression mode from the early closing mode is needed. This switching may be performed after an engine stop request being issued. Even in the course of switching to the decompression mode (late closing mode) from the early closing mode in this way, reducing the knocking is similarly desirable when the closing timing IVC passes through the BDC.

1-2-5. Outline of Engine Control According to First Embodiment

In view of the issues described above, according to the present embodiment, where the intake air pressure has first decreased to a threshold value Pth or lower after an engine start-up is completed, the control device 50 executes a processing to switch from the decompression mode (late closing mode) to the early closing mode. Hereunder, this processing is referred to as a "mode switching processing" for convenience. It should be noted that the threshold value Pth is a negative pressure value, and corresponds to an example of the "first threshold value" and the "second threshold value" according to the present disclosure. That is to say, in the present embodiment, although the first threshold value is the same as the second threshold value, they may be different from each other.

Also, according to the present embodiment, the start of the operations of the throttle valve 24 and the WGV 28 by the air amount control is performed at the following timing after an engine start-up. That is to say, the control device 50 permits the opening of the throttle valve 24 after the closing timing IVC passes through the BDC as a result of the execution of the mode switching processing. Similarly, the control device 50 permits the start (closing) of the operation of the WGV 28 after the closing timing IVC passes through the BDC as a result of the execution of the mode switching processing. Because of this, according to the present embodiment, even where a request to change the throttle opening degree and the WGV opening degree is issued before the closing timing IVC passes through the BDC, the start of the operations of the throttle valve 24 and the WGV 28 are prohibited until the closing timing IVC passes through the BDC.

Moreover, according to the present embodiment, in order to enable the decompression mode to be used at the time of engine start-up, the switching to the decompression mode from the early closing mode is performed when any one of the following three conditions is met. That is to say, this switching is performed after a fuel cut operation for causing the internal combustion engine 10 to stop is performed. Moreover, the switching is performed where, even before the start of this fuel cut operation, the intake air pressure has decreased to the threshold value Pth or lower after an engine stop request is issued. Furthermore, where the switching is not performed before an engine stop because one of these two conditions (i.e., that the fuel cut operation has been performed, or that the intake air pressure has decreased to the threshold value Pth or lower) is not met or where the internal combustion engine 10 has stopped with the switching not completed, the switching is performed during the engine stop (i.e., when another condition is met).

1-2-6. Example of Operation of Engine Control According to First Embodiment (Time of Engine Start-Up and Immediately after Engine Start-Up)

Figure 5:
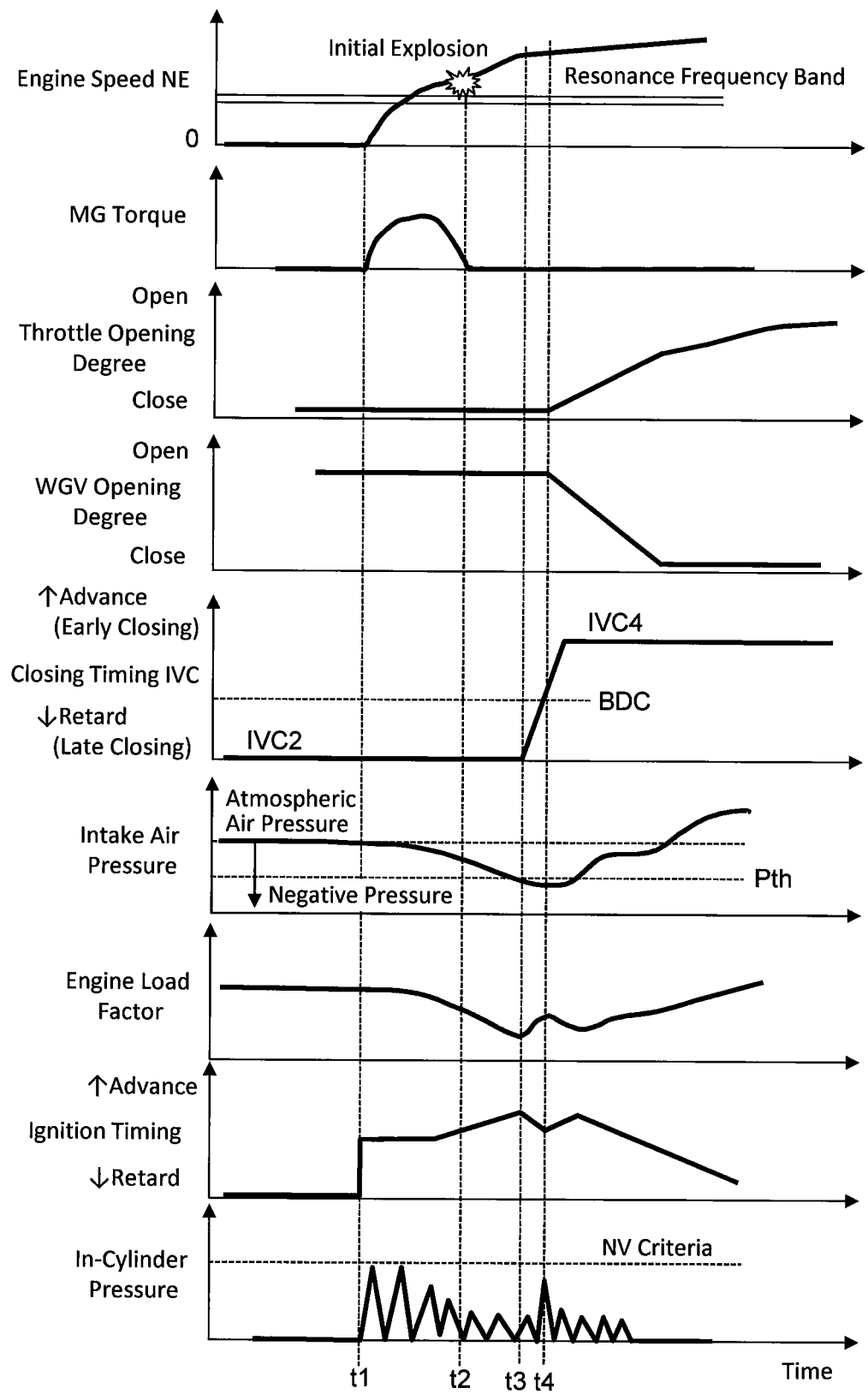
FIG. 5 is a time chart for describing an engine control performed at the time of engine start-up and immediately after the start-up.

FIG. 5 is a time chart for describing an engine control performed at the time of engine start-up and immediately after the start-up. A time point t1 in FIG. 5 corresponds to a time point at which cranking is started as a result of an engine start-up request being issued.

According to the example shown in FIG. 5, the cranking is performed by the use of a torque of the MG12. As a result of the start of the cranking, the engine speed NE increases. In addition, since the throttle valve 24 is closed, the intake air pressure (intake manifold pressure) decreases from the atmospheric air pressure that is a pressure during the engine stop.

The individual peaks of increase and decrease in the in-cylinder pressure that are repeated in the waveform of the in-cylinder pressure in FIG. 5 schematically represent peaks of the in-cylinder pressure during the compression stroke and expansion stroke in each cylinder that arrive in series in accordance with a predetermined explosion order (it should be noted that the number of peaks of the in-cylinder pressure schematically represented in FIG. 5 is different from the actual number of cycles). At the start of the cranking, the intake air pressure is high (i.e., it is equal to the atmospheric air pressure), and thus, the peak values of the in-cylinder pressure also become high as shown in FIG. 5. Thereafter, in association with a decrease of the intake air pressure, the peak values of the in-cylinder pressure also become lower.

After the engine speed NE exceeds a resonance frequency band, fuel injection and ignition are started. This resonance frequency band corresponds to an engine speed range in which resonance of the power train due to compression (i.e. excitation force) in each cylinder is produced. A time point t2 corresponds to a time point at which an initial explosion is performed in a cylinder as a result of the start of the fuel injection and ignition. As a result of the start of combustion, the engine speed NE also increases continuously even after the time point t2, and it is then judged, at a predetermined engine speed (not shown), that the engine start-up has been completed. Thereafter, the engine speed NE enters an idling range. It should be noted that, although the level of vibration of a floor of a vehicle becomes higher in proportion to the in-cylinder pressure, according to the example shown in FIG. 5 the in-cylinder pressure during the cranking is not higher than a predetermined NV (noise and vibration) criteria due to the decompression being performed. This NV criteria corresponds to an in-cylinder pressure value related to an allowable limit of the vibration of the floor of the vehicle.

A time point t3 after the time point t2 corresponds to a time point at which the intake air pressure decreases to the above-described threshold value Pth first after the completion of the engine start-up (i.e., after the engine start-up is judged to be completed). According to the present embodiment, at this kind of time point t3, the switching to the closing timing IVC4 for the early closing mode from the closing timing IVC2 for the decompression mode (i.e., the mode-switching processing described above) is started. The closing timing IVC during an engine operation performed after the completion of the switching to the closing timing IVC4 is controlled with an early closing amount depending on the engine operating state (i.e., the early closing mode is performed).

The actual compression ratio of the internal combustion engine 10 becomes the highest when the closing timing IVC passes through the BDC, and, as a result, the peak value of the in-cylinder pressure becomes higher as schematically illustrated in FIG. 5. When the peak value at the BDC becomes higher due to the intake air pressure being higher, the compression end temperature also becomes higher. Because of this, the knocking becomes easy to occur. Accordingly, the threshold value Pth of the intake air pressure is determined as a value necessary to enable the knocking to be reduced when the closing timing IVC passes through the BDC in the course of the switching described above (more specifically, to enable the intensity and frequency of the knocking to be reduced to the respective designated levels or lower). In addition, where a mechanical compression ratio (i.e., compression ratio defined with a relationship between a minimum volume and a maximum volume of a cylinder) is increased in order to increase the expansion ratio of the miller cycle engine, the occurrence of the knocking immediately after an engine start-up becomes more conspicuous.

A time point t4 corresponds to a time point at which the closing timing IVC passes through the BDC after the start of the control of the closing timing IVC. After the time point t4 is reached, the operations of the throttle valve 24 and the WGV 28 are started. Typically, as a result of depression of the accelerator pedal, the throttle opening degree increases as exemplified in FIG. 5. Similarly, the WGV 28, whose opening degree was controlled to a maximum opening degree within a predetermined opening degree control range at the time of the engine start-up, is closed toward an opening degree depending on a required air amount (i.e., required supercharging pressure) after the elapse of the time point t4.

Additionally, the intake air pressure turns upward as a result of the start of the operations of the throttle valve 24 and the WGV 28 after the elapse of the time point t4. Furthermore, the engine load factor (i.e., in-cylinder charge air amount) decreases in association with a decrease of the intake air pressure after the elapse of the time point t1, and, after the elapse of the time point t3, turns upward due to an increase of the actual compression ratio in association with the advance of the closing timing IVC. After the elapse of the time point t4, the engine load factor once decreases due to the effect of a decrease of the actual compression ratio, and then, further increases due to an increase of the intake air pressure. The ignition timing after the initial explosion at the time point t2 advances in association with a decrease of the engine load factor, and retards in association with an increase of the engine load factor.

(At Time when Engine Stops and During Engine Stop)

Figure 6:
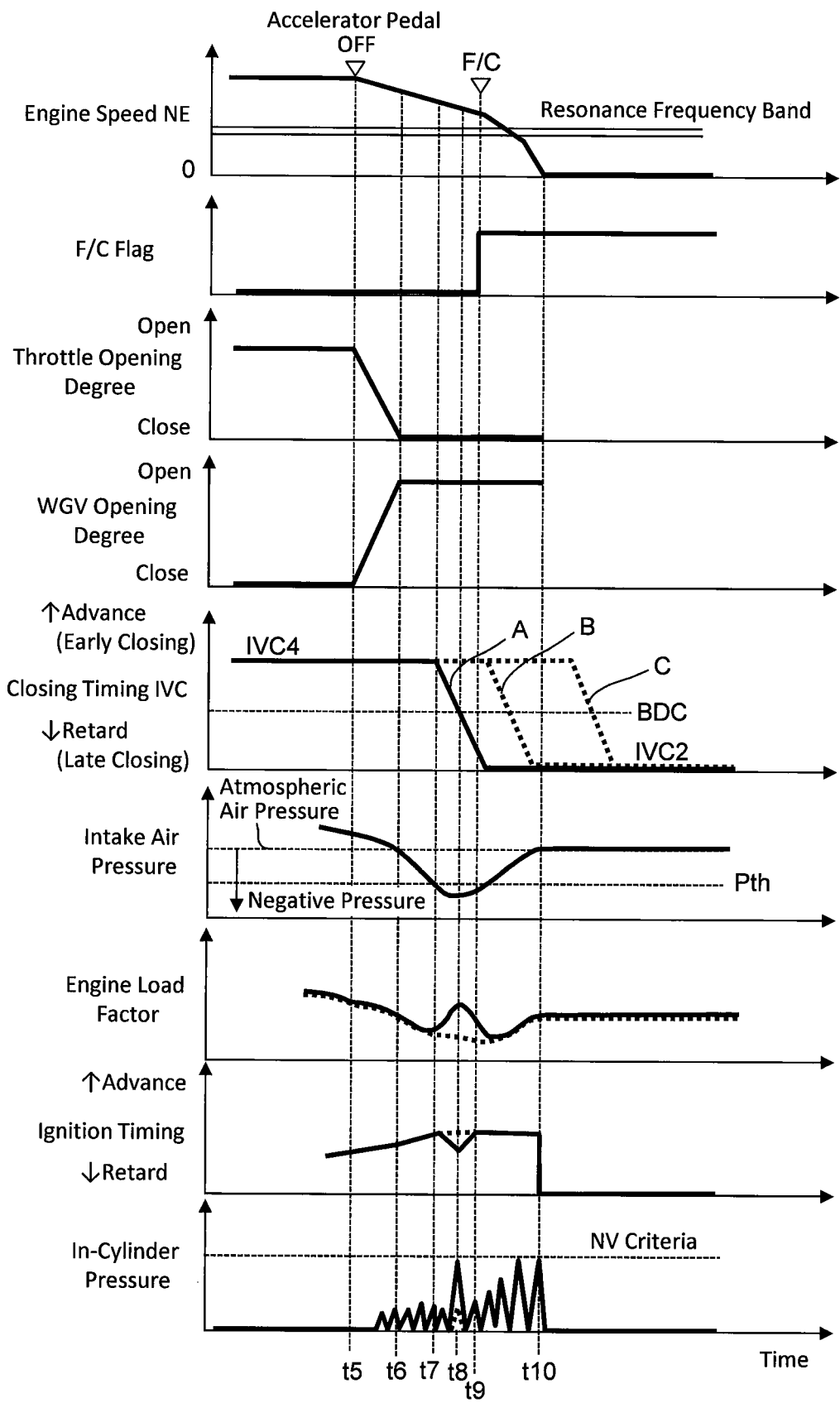
FIG. 6 is a time chart for describing an engine control performed at the time when an internal combustion engine stops and during the engine stop.

FIG. 6 is a time chart for describing an engine control performed at the time when the internal combustion engine 10 stops and during the engine stop. A time point t5 in FIG. 6 corresponds to a time point at which an engine stop request is issued from the driver as a result of the depression of the accelerator pedal being released.

According to the example shown in FIG. 6, as a result of an engine stop request being issued at the time point t5, the throttle valve 24 is closed. In addition, in this example, because the engine stop request is issued during supercharging (intake air pressure>atmospheric air pressure), the operation to open the WGV 28 toward the maximum opening degree is also performed. As a result, the intake air pressure and the engine load factor decrease. In association with this, the engine speed NE decreases. In addition, the ignition timing is advanced in association with a decrease of the engine load factor.

A time point t6 corresponds to a time point at which the operations of the throttle valve 24 and the WGV 28 are completed. In addition, the intake air pressure decreases to around the atmospheric air pressure in the vicinity of this time point t6.

A time point t7 corresponds to a time point at which, as a result of the intake air pressure further decreasing, the intake air pressure is reached to the threshold value Pth first after the completion of the engine start-up. According to the example shown in FIG. 6, when this time point t7 arrives, the switching to the closing timing IVC2 for the decompression mode is started as shown by the solid line with a symbol "A". As a result, the engine load factor increases (solid line) due to an increase of the actual compression ratio. In association with this increase in the engine load factor, the ignition timing is retarded (solid line). In addition, in association with an increase in the actual compression ratio (i.e., approaching of the closing timing IVC to the BDC), air becomes easy to be charged into the cylinders 14, and the intake air pressure thus decreases.

A time point t8 corresponds to a time point at which the closing timing IVC is reached to the BDC. As a result, the peak value of the in-cylinder pressure becomes greater (solid line) due to an increase of the actual compression ratio. In addition, in order to reduce the knocking associated with an increase of the engine load factor, the retard amount of the ignition timing becomes greater in the vicinity of the time point t8. After the elapse of the time point t8, the engine load factor decreases due to a decrease of the actual compression ratio, and, as a result, the retard amount of the ignition timing decreases and also the intake air pressure starts to increase.

A time point t9 corresponds to a time point of start of the fuel cut operation to stop the internal combustion engine 10. In association with the execution of the fuel cut operation, the speed of decrease of the engine speed NE becomes higher. Also, the intake air pressure increases toward the atmospheric air pressure (i.e., intake negative pressure decreases) due to a decrease of the engine speed NE. In association with this, the in-cylinder pressure increases. In addition, according to the example shown in FIG. 6, after the switching to the closing timing IVC2 is completed, the engine speed NE passes through the resonance frequency band. A time point t10 corresponds to an engine stop time point (i.e., engine speed NE=0).

Moreover, according to the example shown by the solid line in FIG. 6, the intake air pressure is reached to the threshold value Pth before the fuel cut operation is executed. Contrary to this kind of example, in an example in which the execution of the fuel cut operation is earlier, the switching to the closing timing IVC2 is started in association with the execution of the fuel cut operation as shown by the broken line with a symbol "B".

Furthermore, FIG. 6 also represents an example in which the switching to the closing timing IVC2 is performed at a desired timing during the engine stop, as shown by the broken line with a symbol "C". According to the internal combustion engine 10 including the electric VVT 38 that can adjust the closing timing IVC, the switching to the closing timing IVC2 can be performed even during an engine stop, as just described. It should be noted that FIG. 6 represents an example in which the switching to the closing timing IVC2 is not started before an engine stop and the retard to the closing timing IVC2 is started after the engine stop.

1-2-7. Processing by Control Device

Figure 7:
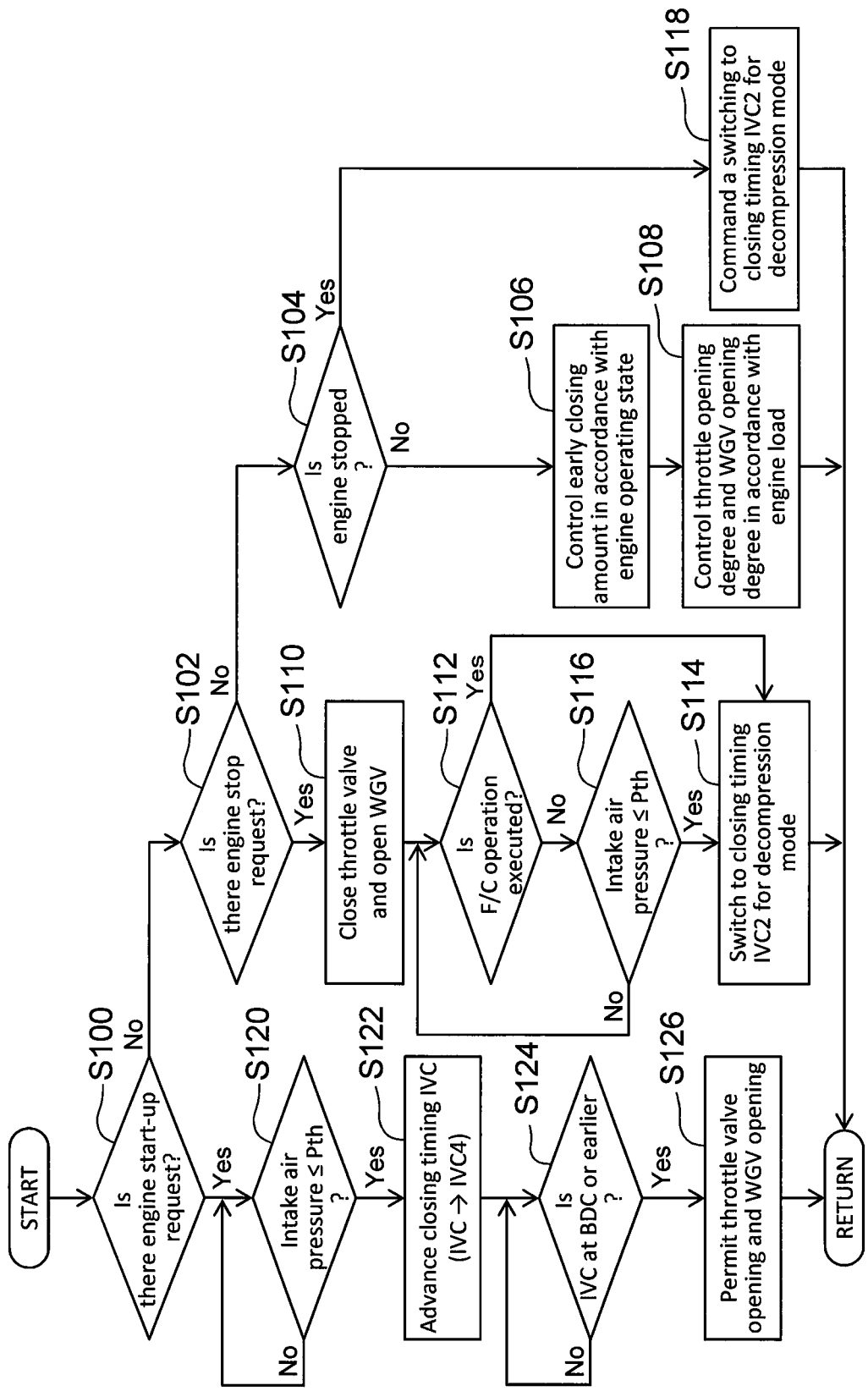
FIG. 7 is a flow chart that illustrates a routine of the processing concerning the engine control according to the first embodiment of the present disclosure.

FIG. 7 is a flow chart that illustrates a routine of the processing concerning the engine control according to the first embodiment. The processing of the present routine is repeatedly executed during the operation of the system of the hybrid vehicle provided with the internal combustion engine 10.

According to the routine shown in FIG. 7, first, the control device 50 determines in step S100 whether an engine start-up request has been issued or not. In detail, in the hybrid vehicle, it is determined whether or not there is a start-up command to the internal combustion engine 10 issued by the control device 50.

If the determination result of step S100 is negative, the control device 50 then determines in step S102 whether an engine stop request has been issued or not. In detail, it is determined whether or not there is an operation stop command to the internal combustion engine 10 issued by the control device 50. This operation stop command includes a command to intermittently stop the internal combustion engine 10 during the operation of the vehicle system. As a result, if there is no operation stop command, the control device 50 determines in step S104 whether the internal combustion engine 10 is in a stopped state (i.e., engine speed NE=0) or not.

If the determination result of step S104 is negative, that is, if any of the engine start-up request and the engine stop request are not issued and the internal combustion engine 10 is not in a stopped state (i.e., the internal combustion engine 10 is in a normal operation state after an engine start-up), the processing proceeds to step S106. In step S106, the control device 50 controls the electric VVT 38 such that the closing timing IVC with an early closing amount depending on the engine operating state is obtained (Early Closing Mode). It should be noted that this kind of control of the closing timing IVC is performed by, for example, changing the rotational phase of the camshaft with respect to the rotational phase of the crankshaft on the basis of the signals of the crank angle sensor 52 and the cam angle sensor 40.

Following the processing of step S106, in step S108, the control device 50 executes the above-described air amount control by adjusting the throttle opening degree and the WGV opening degree in accordance with the engine load (i.e., required engine torque).

If, on the other hand, the determination result of step S102 is positive, the processing proceeds to step S110. In step S110, in response to the engine stop request, the control device 50 closes the throttle valve 24 and also opens the WGV 28 with the maximum opening degree.

Then, in step S112, the control device 50 determines whether a fuel cut operation (F/C) to stop the internal combustion engine 10 is performed or not. As a result, if the F/C is performed, the processing proceeds to step S114. In step S114, the control device 50 executes the late closing by the use of the electric VVT 38 such that the closing timing IVC2 for the decompression mode is selected (Decompression Mode). According to this kind of processing, in preparation for an upcoming engine restart, the closing timing IVC can be, in advance, controlled to the closing timing IVC2 for the decompression mode. It should be noted that, although the closing timing IVC2 is a constant value herein as an example, it may be changed in accordance with one or more desired engine operating conditions.

If, on the other hand, the F/C is not performed, the processing proceeds to step S116. In step S116, the control device 50 determines whether or not the intake air pressure has decreased to the threshold value Pth or lower after the engine stop request is issued. As a result, if the determination result of step S116 is positive, the processing proceeds to step S114, and the switching to the closing timing IVC2 is performed. If, on the other hand, the determination result of step S116 is negative, the processing returns to step S112.

Moreover, if the control device 50 determines in step S104 that the internal combustion engine 10 is in a stopped state, it commands the switching to the closing timing IVC2 in step S118.

Moreover, if the determination result of step S100 is positive, the processing proceeds to step S120. Where an engine start-up request has been issued, cranking, fuel injection and ignition for the engine start-up are performed on the basis of the command from the control device 50. In this step S120, the control device 50 determines whether or not the intake air pressure has decreased to the above-described threshold value Pth or lower first after the engine start-up is completed.

Where the intake air pressure has not yet decreased to the threshold value Pth or lower, the determination of step S120 is repeatedly performed. Where, on the other hand, the intake air pressure has decreased to the threshold value Pth or lower, the processing proceeds to step S122. In step S122, the control device 50 executes the switching (advance) of the closing timing IVC to the IVC4 from the IVC2 by the use of the electric VVT 38. Thereafter, the processing proceeds to step S124.

In step S124, the control device 50 determines whether or not the closing timing IVC is at the BDC or earlier. As a result, where the closing timing IVC has not yet been reached to the BDC, the determination of step S124 is repeatedly performed. Where, on the other hand, the closing timing IVC has advanced to the BDC or earlier, the processing proceeds to step S126.

In step S126, the control device 50 permits the operation to open the throttle valve 24 and the operation to close the WGV 28. In addition, after the closing timing IVC passes through the BDC, the early closing mode is started.

1-3. Advantageous Effects

According to the engine control of the present embodiment described so far, the mode switching processing to switch from the decompression mode (late closing mode) to the early closing mode is performed after an engine start-up as follows. That is to say, the control device 50 performs the mode switching processing after waiting for the intake air pressure to decrease to the threshold value Pth or lower first after the completion of the engine start-up. As a result, the closing timing IVC passes through (i.e., crosses) the BDC after the intake air pressure decreases after the engine start-up. Thus, the in-cylinder charge air amount (i.e., in-cylinder pressure) can be reduced in the vicinity of the BDC at which the actual compression ratio becomes high, whereby the knocking can be prevented from becoming easy to occur in the vicinity of the BDC. As a result, the retard of the ignition timing can be reduced, and the fuel efficiency can thus be improved. In addition, the in-cylinder pressure can be lowered in the vicinity of the BDC, and therefore, the vibration of the floor of the vehicle can also be reduced.

Moreover, according to the engine control of the present embodiment, after the closing timing IVC passes through the BDC as a result of the execution of the mode switching processing, the opening of the throttle valve 24 is permitted. Thus, when the closing timing IVC passes through the BDC, an increase of the in-cylinder charge air amount can be avoided by the operation to open the throttle valve 24. Because of this, the occurrence of the knocking in the vicinity of the BDC can be more effectively reduced.

Moreover, according to the engine control of the present embodiment, after the closing timing IVC passes through the BDC as a result of the execution of the mode switching processing, the closing of the WGV 28 is permitted. Thus, when the closing timing IVC passes through the BDC, an increase of the in-cylinder charge air amount can be avoided by the operation to close the WGV 28. Because of this, the occurrence of the knocking in the vicinity of the BDC can be more effectively reduced.

Moreover, according to the engine control of the present embodiment, the switching to the decompression mode from the early closing mode is performed after the fuel cut operation to stop the internal combustion engine 10 is performed. As a result, the closing timing IVC passes through the BDC with combustion not taking place. Because of this, even where the closing timing IVC passes through (i.e., crosses) the BDC at the time of the switching to the decompression mode, the knocking can be avoided. Furthermore, in association with this, the need to retard the ignition timing can be obviated in the vicinity of the BDC as shown by the broken line in FIG. 6. This leads to an improvement of the fuel efficiency of the internal combustion engine 10. Additionally, since the combustion is not performed in the vicinity of the BDC, the in-cylinder pressure can be lowered in the vicinity of the BDC as shown by the broken line in FIG. 6. Because of this, reduction of the vibration of the floor of the vehicle can also be achieved.

Moreover, according to the engine control of the present embodiment, where, even before the execution of the fuel cut operation, the intake air pressure has decreased to the threshold value Pth or lower after an engine stop request is issued, the switching to the decompression mode from the early closing mode is performed. As a result, the closing timing IVC passes through the BDC after the in-cylinder charge air amount is reduced by lowering the intake air pressure. Because of this, even where the closing timing IVC passes through (i.e., crosses) the BDC at the time of the switching to the decompression mode, the knocking can be avoided. In addition, since the peak value of the in-cylinder pressure is lowered in the vicinity of the BDC as shown by the broken line in FIG. 6, a reduction of the vibration of the floor of the vehicle can also be achieved.

Moreover, according to the engine control of the present embodiment using the electric VVT 38, the switching to the decompression mode from the early closing mode (i.e., the command of the switching to the closing timing IVC2 for the decompression mode) is performed also during an engine stop. As a result of the execution of this switching during an engine stop, the knocking can be avoided when the closing timing IVC passes through the BDC. Also, an issue that the vibration of the floor of the vehicle may increase due to an increase of the in-cylinder pressure does not occur. In addition, even where the retard to the closing timing IVC2 (i.e., it is most retarded) is not completed until an engine stop is performed after an engine stop request is issued, the switching to the closing timing IVC2 can be surely performed.

Furthermore, according to the present embodiment, a device of the "constant operating angle type" is used for the control of the closing timing IVC. As a result, the engine control that can achieve the advantageous effects described so far can be performed while the cost of a valve train is reduced as compared to a miller cycle engine that performs an early closing miller cycle operation mode by the use of a device of a "variable operating angle type".

2. Other Embodiments

2-1. Other Examples of Supercharging Pressure Control Actuator

In the first embodiment described above, the WGV 28 is taken as an example of the "supercharging pressure control actuator" according to the present disclosure. However, another example of the "supercharging pressure control actuator" may be a "variable nozzle device" configured to change the flow velocity of exhaust gas flowing into a turbine of a turbo-supercharger to adjust the amount of exhaust gas energy recovered by the turbine. Furthermore, still another example of the "supercharging pressure control actuator" may be an electric motor of an electrically driven supercharger configured to drive a compressor using the electric motor.

2-2. Another Example of Operation Start Timing of Throttle Valve and Supercharging Pressure Control Actuator In the first embodiment, the operation to open the throttle valve 24 and the operation to close the WGV 28 are started (promptly) when it is recognized that the closing timing IVC is at the BDC or earlier, that is, the closing timing IVC has been reached to the BDC. However, other examples of the operation start timing of the throttle valve and supercharging pressure control actuator according to the present disclosure are available instead of the example described above, as long as the operation start timing is "after the closing timing passes through the intake bottom dead center as a result of the execution of the mode switching processing". That is to say, the operation start timing described above may be, for example, a timing at which the closing timing IVC has been reached to "a crank angle that is advanced by a designated amount with respect to the BDC".

2-3. Another Example of Late Closing Mode

In the first embodiment, the "decompression mode" is taken as an example of the "late closing mode" according to the present disclosure. However, the "late closing mode" may not always be the "decompression mode", and thus, may retard the closing timing IVC relative to the BDC at the time of engine start-up with a desired purpose other than the decompression. In addition, in a miller cycle engine using a device of the "constant operating angle type", such as the electric VVT 38, in order to limit an internal EGR gas amount to satisfy a request to achieve proper combustion at the time of engine start-up, the amount of valve overlap (between an intake valve and an exhaust valve) may be reduced, and, as a result, the closing timing IVC may be retarded as compared to the BDC. This kind of example corresponds to one of other examples of the "late closing mode".

2-4. Other Examples of Switching to Late Closing Mode from Early Closing Miller Cycle Operation Mode In the first embodiment, in order to perform the switching to the late closing mode (decompression mode) from the early closing mode, all of three conditions (i.e., that the fuel cut operation has been performed, that the intake air pressure has decreased to the threshold value Pth or lower, and that the internal combustion engine 10 is in a stopped state) are selectively used. However, the switching to the late closing mode may alternatively be performed selectively using any one or two of the three conditions described above. In addition, in an example in which a variable valve operating device that does not need an engine rotation for the control of the closing timing IVC (for example, electric VVT 38) is used, the switching based on the execution of the fuel cut operation may not always be required to be completed before an engine stop as in the example shown in FIG. 6. That is to say, this switching may alternatively be performed so as to start before an engine stop and be completed after the engine stop.

2-5. Other Examples of Variable Valve Operating Device

"The variable valve operating device" according to the present disclosure may be a device of any other "constant operating angle types" (for example, hydraulic pressure type) other than the electrically-driven type (electric VVT 38). In addition, the "variable valve operating device" according to the present disclosure may be a device of a "variable operating angle type" configured to change the operating angle of an intake valve, instead of using the "constant operating angle type", as long as it can continuously change the closing timing IVC.

2-6. Another Example of Early Closing Miller Cycle Operation Mode

The variable range of the closing timing IVC used in the "early closing miller cycle operation mode" according to the present disclosure may include the BDC itself, instead of the example according to the first embodiment without including the BDC. That is to say, in the early closing miller cycle operation mode, an intake valve may be controlled to close at the intake bottom dead center or earlier.

2-7. Other Examples of System Configuration

The "miller cycle engine" according to the present disclosure may be applied to a vehicle that uses only the miller cycle engine as its power source, instead of the hybrid vehicle described in the first embodiment. In addition, the "miller cycle engine" according to the present disclosure may not always be a spark-ignition engine, and be a compression-ignition engine or a naturally aspirated engine without including a supercharger, such as the turbo-supercharger 20. In an example of not including a supercharger, the intake air flow rate is controlled by, for example, only the throttle valve 24.

The embodiments and modification examples described above may be combined in other ways than those explicitly described above as required and may be modified in various ways without departing from the scope of the present disclosure.

What is claimed is:

1. A miller cycle engine, comprising:
   a variable valve operating device configured to continuously change a closing timing of an intake valve;
   a throttle valve arranged in an intake air passage; and
   a control device configured to execute an early closing miller cycle operation mode to control the variable valve operating device such that the intake valve closes at an intake bottom dead center or earlier,
   wherein the control device is configured to:
   execute a late closing mode to retard the closing timing relative to the intake bottom dead center at a time of engine start-up; and
   execute, where a pressure in the intake air passage has decreased to a first threshold value or lower first after the engine start-up, a mode switching processing to switch from the late closing mode to the early closing miller cycle operation mode.

2. The miller cycle engine according to claim 1,
   wherein the control device is configured to permit an opening of the throttle valve after the closing timing passes through the intake bottom dead center as a result of execution of the mode switching processing.

3. The miller cycle engine according to claim 1, further comprising a supercharging pressure control actuator configured to control supercharging pressure,
   wherein the control device is configured to permit a start of operation of the supercharging pressure control actuator after the closing timing passes through the intake bottom dead center as a result of execution of the mode switching processing.

4. The miller cycle engine according to claim 1,
   wherein the control device is configured, after execution of a fuel cut operation to stop the internal combustion engine, to switch from the early closing miller cycle operation mode to the late closing mode.

5. The miller cycle engine according to claim 1,
   wherein the control device is configured, where the pressure in the intake air passage has decreased to a second threshold value or lower after an engine stop request is issued, to switch from the early closing miller cycle operation mode to the late closing mode.

6. The miller cycle engine according to claim 1,
   wherein the variable valve operating device is an electrically driven variable valve timing device including an electric motor that changes a rotational phase of a camshaft with respect to a rotational phase of a crankshaft, and
   wherein the control device is configured, during an engine stop, to switch from the early closing miller cycle operation mode to the late closing mode.

7. The miller cycle engine according to claim 1,
   wherein the variable valve operating device is configured to change the closing timing by changing an opening timing of the intake valve along with the closing timing while an operating angle of the intake valve is fixed.

* * * * *